United States Patent
Bergquist et al.

(10) Patent No.: US 9,894,548 B2
(45) Date of Patent: Feb. 13, 2018

(54) METHOD AND POLL CONTROL ENTITY FOR CONTROLLING A POLLING PROCEDURE

(71) Applicant: Telefonaktiebolaget L M Ericsson (publ), Stockholm (SE)

(72) Inventors: Gunnar Bergquist, Kista (SE); Samir Shah, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 232 days.

(21) Appl. No.: 14/648,333

(22) PCT Filed: Dec. 3, 2012

(86) PCT No.: PCT/SE2012/051335
§ 371 (c)(1),
(2) Date: May 29, 2015

(87) PCT Pub. No.: WO2014/088477
PCT Pub. Date: Jun. 12, 2014

(65) Prior Publication Data
US 2015/0319635 A1  Nov. 5, 2015

(51) Int. Cl.
*H04W 24/10* (2009.01)
*H04W 72/04* (2009.01)
(Continued)

(52) U.S. Cl.
CPC .......... *H04W 24/10* (2013.01); *H04L 1/1685* (2013.01); *H04L 1/1887* (2013.01);
(Continued)

(58) Field of Classification Search
CPC . H04W 24/10; H04W 56/0065; H04W 74/06; H04W 72/0406; H04L 43/0864; H04L 1/1685; H04L 1/1887
See application file for complete search history.

(56) References Cited

U.S. PATENT DOCUMENTS

| 8,166,164 B1 * | 4/2012 | Luna ...................... H04L 67/22 709/203 |
| 2002/0080816 A1 | 6/2002 | Spinar et al. |

(Continued)

OTHER PUBLICATIONS

International Search Report for International application No. PCT/SE2012/051335, dated Sep. 6, 2013.
(Continued)

*Primary Examiner* — Thai Nguyen
(74) *Attorney, Agent, or Firm* — Baker Botts LLP (57) ABSTRACT

A method and poll control entity (300) for controlling a polling procedure in a radio communication where a data transmitting node (302) transmits data (3:1) to a data receiving node (304) and sends polls to the data receiving node according to a default polling frequency. The polls require the data receiving node to send feedback (3:2) to the data transmitting node indicating whether said data has been received and decoded by the data receiving node or not. The poll control entity detects (3:3*a-c*) a trigger of the radio communication indicating a deviation of a feedback time which is a time period between a time of sending the poll and a time of receiving the feedback from an expected feedback time range. The poll control entity then adjusts (3:4) the polling frequency based on the detected trigger such that the deviation of the feedback time is reduced, and enforces (3:5) the adjusted polling frequency at the data transmitting node. In this way, the polling frequency can be dynamically and individually adapted to the current situation of traffic load and/or radio conditions which may influence the resulting feedback time in the radio communication, to achieve efficient communication of data and good throughput.

24 Claims, 4 Drawing Sheets

(51) Int. Cl.
H04W 74/06 (2009.01)
H04L 12/26 (2006.01)
H04W 56/00 (2009.01)
H04L 1/16 (2006.01)
H04L 1/18 (2006.01)

(52) U.S. Cl.
CPC ..... *H04L 43/0864* (2013.01); *H04W 56/0065* (2013.01); *H04W 72/0406* (2013.01); *H04W 74/06* (2013.01)

(56) References Cited

U.S. PATENT DOCUMENTS

2005/0041652 A1 2/2005 Roy
2006/0268812 A1* 11/2006 Wilson ................. H04W 28/18
  370/346
2007/0223415 A1 9/2007 Ji
2007/0245008 A1* 10/2007 Matsui ................. H04L 67/322
  709/223

OTHER PUBLICATIONS

PCT Written Opinion of the International Searching Authority for International application No. PCT/SE2012/051335, Filing Date Dec. 3, 2012.

* cited by examiner

METHOD AND POLL CONTROL ENTITY FOR CONTROLLING A POLLING PROCEDURE

PRIORITY

This nonprovisional application is a U.S. National Stage Filing under 35 U.S.C. § 371 of International Patent Application Serial No. PCT/SE2012/051335, filed Dec. 3, 2012, and entitled "METHOD AND POLL CONTROL ENTITY FOR CONTROLLING A POLLING PROCEDURE."

TECHNICAL FIELD

The present disclosure relates generally to a method and a poll control entity for controlling a polling procedure in a radio communication where a data transmitting node transmits data to a data receiving node and sends a poll to the data receiving node requiring the data receiving node to send feedback indicating whether it has received and decoded the transmitted data or not.

BACKGROUND

When data is communicated between a base station of a wireless communication network and a User Equipment (UE) served by the base station, a Radio Link Control (RLC) protocol can be applied as an RLC layer being a sub-layer of Layer 2 for handling this data communication, which has been specified by the Third Generation Partnership Project (3GPP) for Long Term Evolution (LTE) networks. The RLC layer is typically implemented by using data receiving and transmitting RLC entities in both the base station and the UE. The RLC entities are configured to exchange data in the form of Service Data Units (SDUs), of a higher layer over a logical channel configured by the so-called Radio Resource Control (RRC) layer thus being a higher layer above the RLC layer. On a lower layer called the Medium Access Control (MAC) layer, such logical channels are mapped to transport channels where the data is communicated in the form of data blocks, which communication is controlled by a so-called MAC-scheduler.

At RLC level, data in an SDU may further be re-arranged and segmented into different chunks of data, referred to as Protocol data Units (PDUs), before transmission, which are put together again at the receiving side. A PDU may be either smaller or larger than the SDU such that an SDU may be divided into several smaller PDUs, or data in multiple SDUs may be concatenated into fewer PDUs. Depending on the communication service used and/or current traffic situation, it may be required that reception of the transmitted PDUs is confirmed by means of PDU status reports sent from the data receiving RLC entity in one node as feedback to the data transmitting RLC entity in an opposite node. This can be applied for both downlink and uplink communication of data.

The RLC entities can be configured to apply different communication modes referred to as Transparent Mode (TM), Unacknowledged Mode (UM) and Acknowledged Mode (AM). In AM, PDUs are communicated and acknowledgement of correct reception of the PDUs is required and expected at the data receiving RLC entity in the form of the above-described PDU status reports, which is a process commonly referred to as Automatic Repeat request (ARQ). TM and UM do not require any such status reporting and any data that has not been received properly will be missing or discarded at the receiving side and no retransmission of the missing data will be requested either. Which mode to use for a session is decided by a radio bearer mapping function at the base station, typically based on the type of service used and possibly also on the available resources, and the selected mode is signalled from the base station to the UE at establishment of a radio bearer, referred to as "radio bearer setup".

In the following description, RLC and AM will be used as an illustrative example, although the issues and features discussed in this disclosure may apply to any mechanisms involving status reporting of correctly received and decoded data regardless of whether the data is received in PDUs or any other format.

Figure 1:
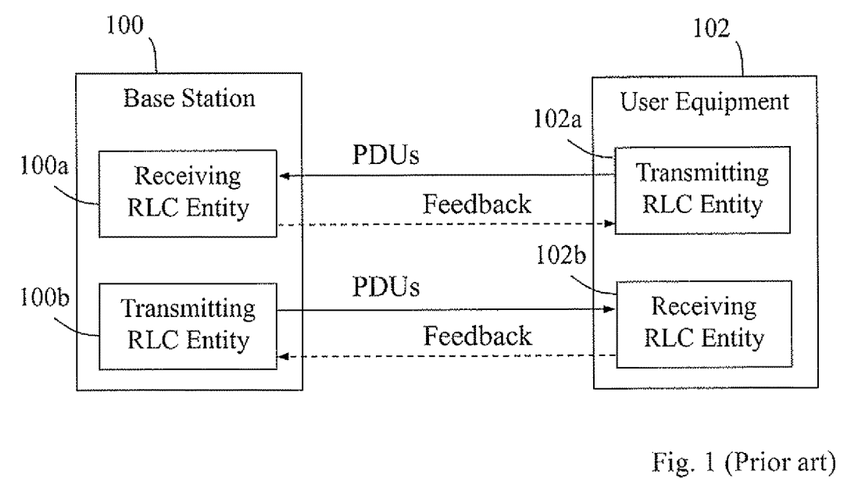
FIG. 1 is a communication scenario illustrating transmission and acknowledgement of data between a base station and a UE, according to the prior art.

In FIG. 1, a base station 100 is schematically shown comprising a data receiving RLC entity 100a and a data transmitting RLC entity 100b. Further, a UE 102 served by base station 100 comprises a data receiving RLC entity 102b which can receive data, e.g. PDUs, from the data transmitting RLC entity 100b, and a data transmitting RLC entity 102a which can transmit data, e.g. PDUs, to the data receiving RLC entity 100a.

With this configuration, data in the form of PDUs may be sent on an uplink channel from the data transmitting RLC entity 102a to the data receiving RLC entity 100a. In that case, corresponding PDU status reports may be sent as feedback on an opposite downlink channel from the data receiving RLC entity 100a to the data transmitting RLC entity 102a, such as when the above AM is used, as shown in the figure. Correspondingly, PDUs may also be sent on a downlink channel from the data transmitting RLC entity 100b to the data receiving RLC entity 102b. In that case, PDU status reports may be sent on an opposite uplink channel from the data receiving RLC entity 102b to the data transmitting RLC entity 100b.

There are some drawbacks associated with the use of status reporting, e.g. according to the above AM RLC procedure, such as delayed data delivery, increased signaling overhead and pointless or unnecessary re-transmissions. For example, required and expected status reports may sometimes not arrive on time or not at all to the data transmitting node, resulting in re-transmission of data since that data has not been acknowledged by the data receiving node, at least as perceived by the data transmitting node. This situation may thus occur even when the data has in fact been received and decoded successfully at the data receiving node and an acknowledging status report has been sent but not delivered properly or in due time to the data transmitting node, for some reason.

In some cases, a polling procedure is applied where the data transmitting node explicitly commands the data receiving node to send a status report as feedback indicating whether transmitted data has been properly received, by adding a poll to the data transmitted to the data receiving node. A poll may be sent by setting a bit in a header field attached to the transmitted data, e.g. a specific polling field in the header is typically set to "1". Such polls are sent according to a certain polling frequency and any data that has not been acknowledged by the data receiver before expiry of a timer will become a candidate for retransmission.

SUMMARY

It is an object of embodiments described herein to address at least some of the problems and issues outlined above. It is possible to achieve these objects and others by using a method and a poll control entity as defined in the attached independent claims.

According to one aspect, a method is performed by a poll control entity for controlling a polling procedure in a radio communication where a data transmitting node transmits data to a data receiving node and sends polls to the data receiving node according to a default polling frequency. The polls require the data receiving node to send feedback to the data transmitting node indicating whether the data has been received and decoded by the data receiving node or not.

In this method, the poll control entity detects a trigger of the radio communication which trigger indicates a deviation of a feedback time of the radio communication from an expected feedback time range. The feedback time is a time period between a time of sending the poll from the data transmitting node and a time of receiving the feedback at the data transmitting node. the poll control entity then adjusts the polling frequency based on the trigger of the radio communication such that the deviation of the feedback time is reduced, and enforces the adjusted polling frequency at the data transmitting node.

According to another aspect, a poll control entity is configured to control a polling procedure in a radio communication where a data transmitting node transmits data to a data receiving node and sends polls to the data receiving node according to a default polling frequency. The polls require the data receiving node to send feedback to the data transmitting node indicating whether the data has been received and decoded by the data receiving node or not.

The poll control entity comprises a detecting unit adapted to detect a trigger of the radio communication indicating a deviation of a feedback time which is a time period between a time of sending the poll and a time of receiving the feedback from an expected feedback time range. The poll control entity also comprises a logic unit adapted to adjust the polling frequency based on the trigger of the radio communication such that the deviation of the feedback time is reduced, and an enforcing unit adapted to enforce the adjusted polling frequency at the data transmitting node.

When using any of the above method and poll control entity, the polling frequency can be dynamically and individually adapted to the current situation of the radio communication, instead of using a fixed polling frequency, to enable efficient communication of data and good throughput even when the situation changes. For example, the current traffic load and/or radio conditions of the radio communication may influence the resulting feedback time which thus may vary in time and the polling frequency can be adapted accordingly. The above method and poll control entity may thus be used to optimize or at least improve the polling frequency used for the radio communication between the data transmitting node and the data receiving node. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

In this disclosure, the term base station is used to represent a radio node of a wireless or cellular network which node is capable of communicating with wireless UEs over radio channels. Depending on the terminology used, a base station may also be called NodeB, eNodeB, eNB, base transceiver station, and so forth. Further, the term User Equipment, or UE, is used here to represent any terminal or device capable of communicating with the above base station and network over radio channels. Without limitation, the UE may be a handheld device operated by a human user or an automatically operating device sometimes referred to as a Machine-to-Machine (M2M) device. In the following examples, either of the base station and the UE may be a data transmitting node or a data receiving node.

Briefly described, a solution is provided in a poll control entity for controlling a polling procedure for feedback of proper data reception in a radio communication, by introducing a more flexible use of the above-described polling procedure chiefly using an adaptive polling frequency that can be adjusted in certain circumstances, instead of a fixed one. The adjustable polling frequency is adjusted depending on a current "feedback time", which is a time period between the time of sending a poll from a data transmitting node and the time of receiving feedback from a data receiving node, e.g. in the form of a status report or the like, at the data transmitting node.

In this solution, it has been recognized that the feedback time may deviate from an expected or "normal" feedback time range, e.g. due to the current traffic load, resource utilization and/or radio conditions. For example, if the resulting feedback time is greater than the expected range, there is a risk that the feedback for transmitted data will not arrive in time, e.g. before a timer expires at the data transmitting node, even if the data has been received and decoded properly at the data receiving node. In that case, the data transmitting node may prematurely decide to retransmit the data, although it is not needed. To avoid this behavior, the poll control entity adjusts the polling frequency by decreasing it to counteract and reduce this deviation of the feedback time from the expected feedback time range, and enforces the adjusted polling frequency at the data transmitting node. As a result, the latter node will allow for longer feedback time, by the polling frequency being decreased, and unwarranted retransmissions of data can be avoided. The currently prevailing feedback time may be estimated and a deviation from the expected range may be detected in different ways which will be described in the following. First, the polling procedure as such will be outlined in more detail.

For example, when RLC entities are used in a base station and a UE, a data transmitting RLC entity is typically able to set a poll bit in the header of a transmitted Data PDU to prompt the opposite data receiving RLC entity to send a Status report, or "feedback" which term will be used throughout this description. The poll mechanism may also be used in other types of data transmitting nodes and is thus not limited to RLC entities. Such a poll request is normally sent with new data but if there is no new data or if the transmitter in the data transmitting node is "stalled" and cannot deliver more new data, previously transmitted data may be re-transmitted with the poll bit set in the header of that data. Alternatively, the data receiving node may itself trigger a status report as feedback if it detects that data is missing, which is however outside the scope of this solution.

If a status report indicates that a PDU has not been received properly, or if no status report has been received at all for that PDU, at least not before expiry of a timer, the data transmitting node is typically configured to re-transmit the PDU since it has not been acknowledged as properly received and decoded. A PDU that has not been reported as properly received will thus end up as a candidate for re-transmission after a configured amount of time, according to a timeout parameter, or "timer", which in LTE is called "t-PollRetransmit". The time between retransmissions is controlled by the timer t-PollRetransmit if no new data can be delivered, and by either or both of optional thresholds called pollPDU and pollByte if new data can be delivered. A standardized transmitting RLC entity using AM is configured to start or restart the timer t-PollRetransmit each time it delivers a PDU including a poll to lower layer, i.e. the timer is started at the very transmission occasion. The transmitting RLC entity then stops the timer t-PollRetransmit upon reception of a STATUS report comprising either a positive or a negative acknowledgement.

The re-transmission may be repeated a number of times e.g. until a status report is received as feedback from the data receiving node indicating that the PDU has been received and decoded properly, or until a timeout or maximum number of re-transmissions is reached. The above polling procedure typically used for RLC entities is also relevant and applicable for any data transmitting node and data receiving node, which general terms will be used in the following without limitation to RLC.

It is however a problem that such polls may be transmitted to the data receiving node too frequently when it is not able to provide feedback to the data transmitting node in due time such that the required feedback starts lagging behind. The reason for this may be that the radio link used for transmitting the data has low throughput, e.g. as a result when the radio link is overloaded by traffic or has poor radio conditions due to high interference or bad coverage, resulting in delays in scheduling the data transmissions on the radio link such that the data is received and decoded late at the data receiving node, if at all. The data transmitting node may then take premature decisions to re-transmit unacknowledged data when acknowledgement is expected but not received in time, even though it is not necessary to re-transmit when the data is actually received and decoded eventually, albeit somewhat late. On the other hand, the data may be received and decoded very fast when using a radio link for the data transmission with high throughput and good radio conditions, and the feedback may also arrive faster than expected if the feedback radio link is unproblematic. This favorable situation cannot be fully exploited to increase the data throughput if a fixed polling frequency is used since transmission of the next data must wait for the timer to expire.

Figure 2:
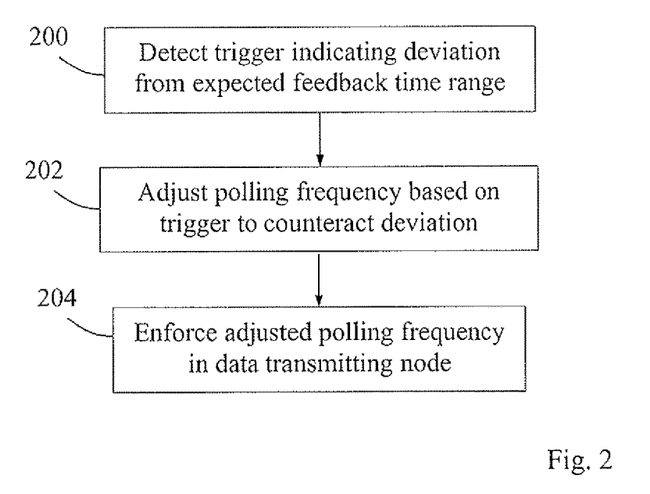
FIG. 2 is a flow chart illustrating a procedure performed by a poll control entity, according to further possible embodiments.

An example of actions performed by a poll control entity for controlling a polling procedure in a radio communication will now be described with reference to the flow chart in FIG. 2. In the radio communication, a data transmitting node transmits data to a data receiving node and sends polls to the data receiving node initially according to a default polling frequency. The polls effectively indicate that the data receiving node is required to send feedback to the data transmitting node indicating whether the transmitted data has been received and decoded by the data receiving node or not. The polls thus act as triggers for the data receiving node to send the feedback. As mentioned above, the polls may be sent together with data according to the polling frequency and may be implemented in a polling bit or field in a header of the data. A poll may thus be sent simply by setting a polling bit to 1 or 0 in the header. In conventional polling procedures, the polls are sent with a fixed polling frequency whereas the polls can be sent with an adaptive polling frequency in the embodiments described herein as follows.

It may be assumed that the radio communication involves data transmission between a User Equipment (UE) and a base station of a wireless communication network, either in uplink or downlink. In that case, the data transmitting node may be either the base station or the UE, and conversely the data receiving node may be the opposite UE or base station, although the solution is not limited to be used by UEs and base stations. The poll control entity is an entity that performs the following actions and may be suitably implemented in the data transmitting node or in a scheduler of a base station. The poll control entity may be configured to accomplish any of the embodiments described herein, e.g. by means of a processor controlled by a suitable computer program.

In a first shown action 200, the poll control entity detects a trigger of the radio communication indicating a deviation of a feedback time from an expected feedback time range. In this context, "feedback time" refers to the time period between the time of sending the poll from the data transmitting node and the time of receiving the feedback at the data transmitting node. It should be noted that the currently resulting feedback time is highly dependent on the conditions regarding the link used for transmitting the poll and also on conditions regarding the opposite link used for transmitting the feedback. Such prevailing conditions, or states, of these links may relate to current traffic load and available resources in the network, as well as current radio conditions such as radio coverage and interference situation, to mention a few examples.

Figure 3:
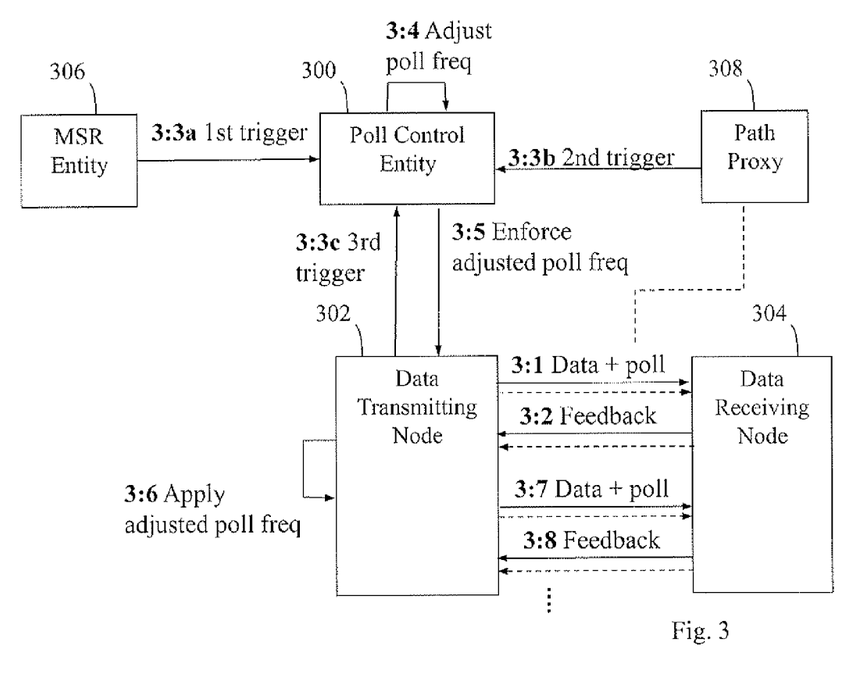
FIG. 3 is a block diagram illustrating an example of a communication scenario where a poll control entity is used, according to further possible embodiments.

The trigger of this action may be detected in different ways which will be described later with reference to FIG. 3. The term "expected feedback time range" refers to a range of feedback time within which the feedback time lies during ordinary or average conditions. Alternative terms that could be used in this context instead of "expected" are "middle", "average", "intermediate", "central" and so forth. Further, the default polling frequency is deemed suitable to use when the feedback time lies within the expected feedback time range during more or less ordinary circumstances. Depending on the current conditions or states of the links used for data and feedback, the above-mentioned deviation may occur when the conditions or circumstances change such that the feedback time either exceeds or falls below the expected feedback time range, such that the feedback time can be regarded as an "abnormal" or divergent feedback time. Further, the feedback time may be estimated in different ways, and some examples will be described later below.

Having detected the trigger indicating a deviation of the feedback time from an expected feedback time range, the poll control entity adjusts the polling frequency based on the detected trigger such that the deviation of the feedback time is reduced, or counteracted, in another action 202. Hence, the adjusted polling frequency is different from the so far used default polling frequency and may be adjusted by either decreasing or increasing the polling frequency.

Figure 2A:
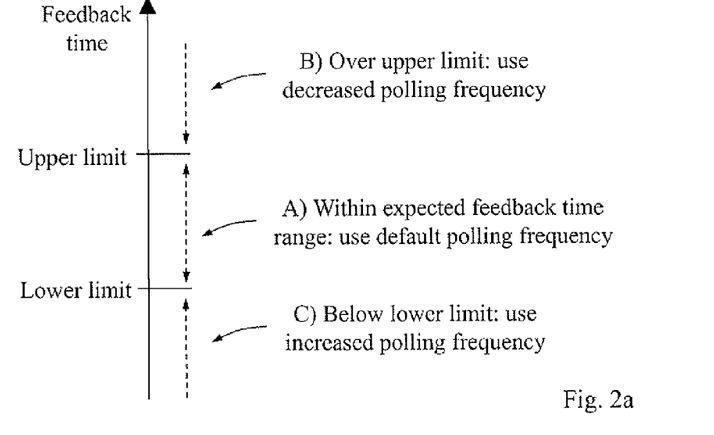
FIG. 2a is a schematic diagram illustrating when different polling frequencies may be used, according to further possible embodiments.

In some possible embodiments, the expected feedback time range is flanked by an upper limit and a lower limit of the expected feedback time range, which is illustrated in FIG. 2a. When the current feedback time lies within the expected feedback time range, i.e. between the upper and lower limits, the default polling frequency is used, as shown by case A) in FIG. 2a. In one embodiment, the polling frequency may be adjusted by decreasing the polling frequency when the detected trigger indicates that the feedback time is longer than the upper limit, as shown by case B). In another embodiment, the polling frequency may be adjusted by increasing the polling frequency when the detected trigger indicates that the feedback time is shorter than the lower limit, as shown by case C) in the figure.

Returning to FIG. 2, the poll control entity then enforces the adjusted polling frequency at the data transmitting node, shown by a further action 204, such that the adjusted polling frequency is applied by the data transmitting node instead of the default polling frequency when transmitting data to the data receiving node. In other words, the poll control entity instructs the data transmitting node to employ, i.e. apply and use, the adjusted polling frequency instead of the default polling frequency. Thereby, the polling frequency used by the data transmitting node will be adapted to the current conditions and circumstances, particularly relating to either or both of the communication links used for data and feedback, respectively. If a UE is the data transmitting node, the adjusted polling frequency may be enforced by sending to the UE an information element called "RLC-config" comprising the parameter t-PollRetransmit. The RLC config can be sent to the UE using a procedure called RRC Connection Reconfiguration.

For example, the solution may be used to avoid that too high polling frequency is used which otherwise may result in unnecessary signaling and retransmissions of data even if the data was successfully received and decoded in the first place, as explained above. In another example, it may be avoided that too low polling frequency is used which otherwise would limit the data throughput to be not as high as otherwise would be possible, as also explained above.

When the polling frequency has been adjusted and enforced, the deviation of the current feedback time from an expected feedback time range will thus be reduced, or counteracted, or even eliminated in due course, since the polling frequency has been adapted to the prevailing circumstances, e.g. the current load on the links used for data and feedback, respectively. After adjusting and enforcing the polling frequency as described above, the poll control entity may continue to monitor, or measure, the current feedback time, e.g. with respect to another trigger condition or the like controlling when to revert to the default polling frequency again. In another possible embodiment, the poll control entity may thus instruct the data transmitting node to revert to the default polling frequency when it is detected that the feedback time is within the expected feedback time range, i.e. has returned to a value between the upper and lower limits as in case A) illustrated in FIG. 2a.

An example of a possible scenario of a radio communication where the solution is employed, will now be described with reference to FIG. 3. In this example, a poll control entity 300 monitors the feedback time of a radio communication between a data transmitting node 302 and a data receiving node 304 with respect to an expected feedback time range, which may have been defined by an upper limit and a lower limit of the expected feedback time range, e.g. as shown in FIG. 2a. The feedback time is monitored basically by watching for a trigger of the radio communication that indicates a deviation of the feedback time from the expected feedback time range. In this example, three different potential triggers are shown, denoted first, second and third triggers, respectively, each of which can be used as the trigger of the radio communication to indicate the above deviation of the monitored feedback time from the expected feedback time range. The poll control entity 300 may be configured to detect one, two or all three of them.

A first action 3:1 illustrates that the data transmitting node 302 sends data together with a poll to the data receiving node 304, the poll requiring the data receiving node 304 to send feedback, e.g. in the form of status reports or the like, to the data transmitting node 302 indicating whether the data has been received and decoded by the data receiving node 304 or not. Another action 3:2 illustrates that the data receiving node 304 sends feedback accordingly to the data transmitting node 302, which may arrive at node 302 in time, too late, or not at all, depending on the current circumstances, e.g. the current load on the links used for data and feedback as described above. Actions 3:1 and 3:2 are repeated, as shown by dashed arrows, in accordance with a default polling frequency which is initially used by the data transmitting node 302 until a new adjusted polling frequency is enforced as follows.

In either of the following alternative actions 3:3a-c, the poll control entity detects a trigger of the radio communication indicating a deviation of a current feedback time from an expected feedback time range, i.e. as described for action 200 above. In one alternative action 3:3a, the trigger of the radio communication indicating the deviation comprises the first trigger which indicates that the utilization of a resource used for the radio communication exceeds an upper utilization limit or falls below a lower utilization limit. The resource may be a dynamically utilized resource which is a potential "bottleneck" for the radio communication in the sense that the load on the resource affects the feedback time. The resource may further be a shared resource which can be dynamically allocated and used for multiple radio communications. The resource in this context may comprise a radio resource such as amount of scheduling entities, amount of physical resource blocks and/or amount of control channel elements. In an LTE network for example, the radio resource may be associated with various channels used for communication according to LTE: e.g. for uplink data transmissions on the channel called Physical Uplink Shared Channel (PUSCH), or for downlink data transmission on the channel called Physical Downlink Shared Channel (PDSCH), or for scheduling on PUSCH or PDSCH e.g. using the channel called Physical Downlink Control Channel (PDCCH), or for transmitting physical layer acknowledgements or quality information e.g. on the channels called Physical Hybrid-ARQ Indicator Channel (PHICH) and Physical Uplink Control Channel (PUCCH).

In this case, the poll control entity 300 detects the first trigger from an entity 306 that monitors usage and performance of resources in the network, which entity may be called a "Monitored System Resources" (MSR) entity 306. The MSR entity 306 is configured to identify and monitor a potential bottleneck resource and to provide the first trigger to the poll control entity 300 when the utilization of that resource exceeds the upper utilization limit or falls below the lower utilization limit. The first trigger may be provided to the poll control entity 300 by means of a suitable internal protocol depending on the implementation.

In another alternative action 3:3b, the trigger of the radio communication indicating the deviation comprises the second trigger indicating that a current Round Trip Time (RTT) of the radio communication between the data transmitting and receiving nodes exceeds an upper RTT limit or falls below a lower RTT limit. The RTT is thus closely related to the feedback time. In this case, the poll control entity 300 detects the second trigger from a so-called "path proxy" 308 located in a transmit-receive path between the data transmitting and receiving nodes 302, 304, as schematically shown by a dashed line in the figure. Likewise, the second trigger may be provided to the poll control entity 300 by means of some internal protocol depending on the implementation. The current feedback time may be determined by measuring at least a part of the current RTT. For example, the measured part of the RTT may be the time of conveying data from the data transmitting node to the data receiving node, or the time of conveying feedback from the data receiving node to the data transmitting node. Further, this part of the current RTT may depend on a delay in scheduling transmission of at least one of the data and the feedback.

In another alternative action 3:3c, the trigger of the radio communication indicating the deviation comprises the third trigger which is received from the data transmitting node 302 when the data transmitting node detects that the amount of pending data to be transmitted exceeds a certain data amount threshold. In other words, the third trigger may indicate that the transmit buffer in data transmitting node 302 comprising the pending data is congested, i.e. "choked", because the transmission of new data from the buffer is too slow due to long waiting time for feedback from the data receiving node 304, which thus indicates that the current feedback time has exceeded the upper limit of feedback time range described above. In that case, the feedback time should be decreased as of case B) in FIG. 2a. On the other hand, the third trigger may indicate that the transmit buffer in node 302 is empty because the transmission of new data from the buffer is too fast which thus indicates that the current feedback time has fallen below the lower limit of feedback time range described above. In that case, the feedback time should be increased as of case C) in FIG. 2a. Also the third trigger may be received from the data transmitting node 302 by means of some internal protocol depending on the implementation.

Having detected either of the first, second and third triggers described above, the poll control entity 300 adapts the polling frequency accordingly by adjusting it based on the trigger of the radio communication, in another action 3:4, either by decreasing or increasing the polling frequency depending on the deviation indicated by the detected trigger as of cases B) and C) in FIG. 2a, respectively. This may be executed in practice in different ways and some possible examples will be described in more detail later below. A further action 3:5 illustrates that the poll control entity 300 enforces the adjusted polling frequency at the data transmitting node 302 which then applies the adjusted polling frequency in another action 3:6. Further actions 3:7 and 3:8 illustrate that the data transmitting node 302 sends data together with a poll to the data receiving node 304 and receives feedback, while using the new adjusted polling frequency.

Figure 4:
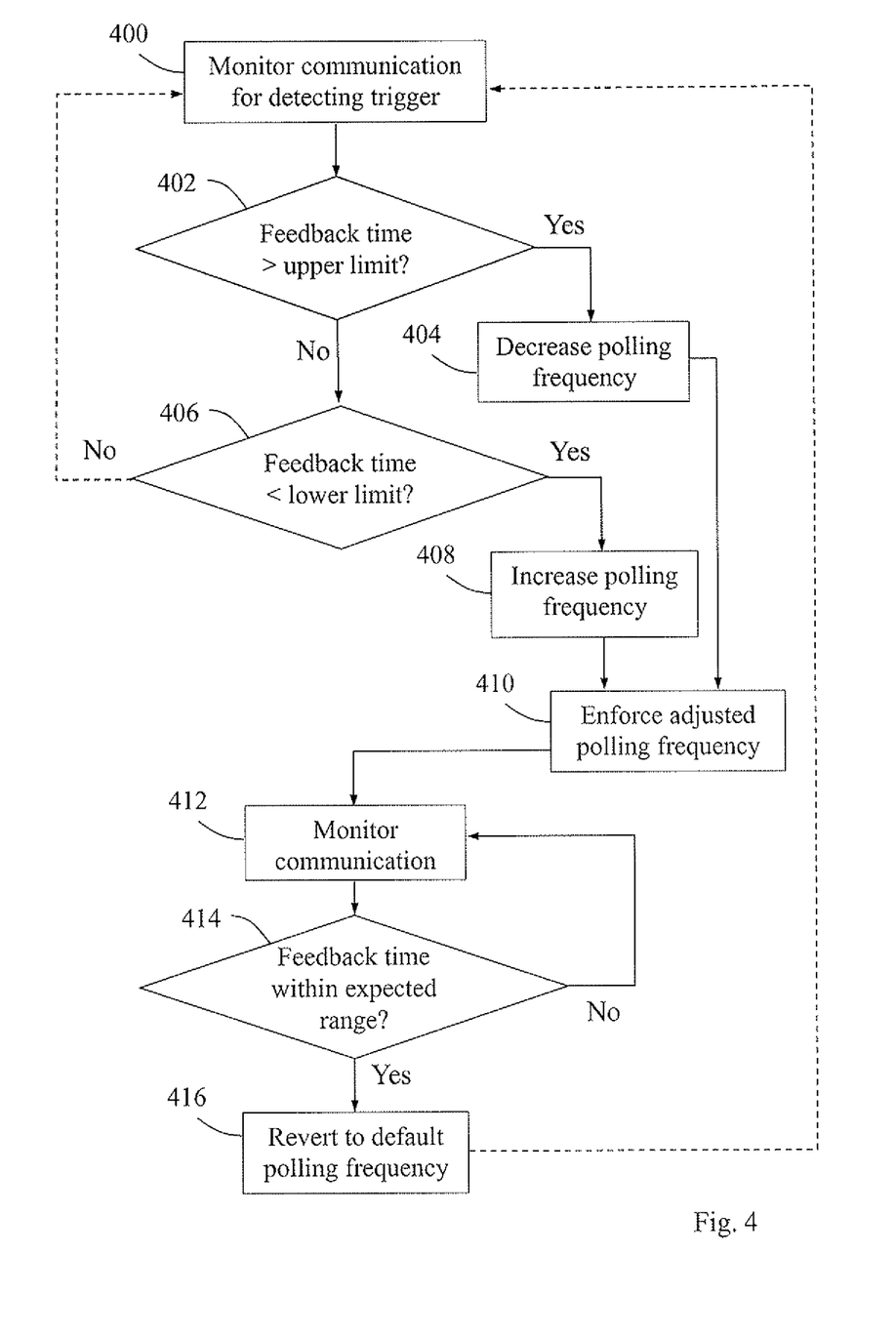
FIG. 4 is a flow chart illustrating a more detailed example of a procedure performed by a poll control entity, according to further possible embodiments.

A more detailed example of a procedure performed by a poll control entity for controlling a polling procedure involving a data transmitting node and a data receiving node in a radio communication, will now be described with reference to the flow chart in FIG. 4. The poll control entity in this example may be similar to the poll control entity 300 in FIG. 3 or the poll control entity described for FIG. 2 and FIG. 2a above. A first action 400 illustrates that the poll control entity monitors the radio communication for detecting a trigger of the radio communication indicating a deviation of a feedback time from an expected feedback time range. Initially, the data transmitting node 302 applies a default polling frequency which is deemed appropriate as long as the current feedback time is within the expected feedback time range.

In a next action 402, it is determined whether any detected trigger of the radio communication indicates that the feedback time is longer than an upper limit, i.e. a maximum value, of the expected feedback time range. If so, the poll control entity decreases the polling frequency in an action 404, just as in case B) of FIG. 2a. If the current feedback time does not exceed the upper limit of feedback time range, it is further determined in an action 406 whether any detected trigger of the radio communication indicates that the current feedback time is shorter than a lower limit, i.e. a minimum value, of the expected feedback time range. If so, the poll control entity increases the polling frequency in an action 408, just as in case C) of FIG. 2a. Another action 410 illustrates that the poll control entity enforces the adjusted polling frequency of either action 404 or 408 in the data transmitting node. If the outcome of both determining actions 402 and 406 is negative, i.e. the feedback time is neither longer than the upper limit nor shorter than the lower limit, the poll control entity may return to action 400 for continuing monitoring the radio communication for detecting a trigger of the radio communication, as shown by a left-sided dashed arrow.

As mentioned above, by enforcing the adjusted polling frequency, the deviation of the feedback time from the expected feedback time range is counteracted, i.e. reduced. After action 410 of enforcing an adjusted polling frequency, the procedure may therefore continue by further monitoring the radio communication for detecting another trigger of the radio communication, in an action 412, which trigger may be called a "revert trigger", that indicates a return of the feedback time back to the expected feedback time range. It is thus determined in an action 414 whether any detected trigger indicates that the feedback time has returned to fall within the expected feedback time range. If not, the poll control entity goes back to action 412 to continue monitoring the radio communication. If it is determined in action 414 that a detected trigger of the radio communication, e.g. any of the above-described first, second and third triggers, indicates that the feedback time is within the expected feedback time range, the poll control entity instructs the data transmitting node 302 to revert to the default polling frequency, as shown by another action 416, thus effectively enforcing the default polling frequency to be applied in the data transmitting node 302. Thereafter, the poll control entity may return to action 400 to continue monitoring the radio communication for detecting a trigger indicating a deviation of the feedback time from an expected feedback time range, as shown by a right-sided dashed arrow.

Figure 5:
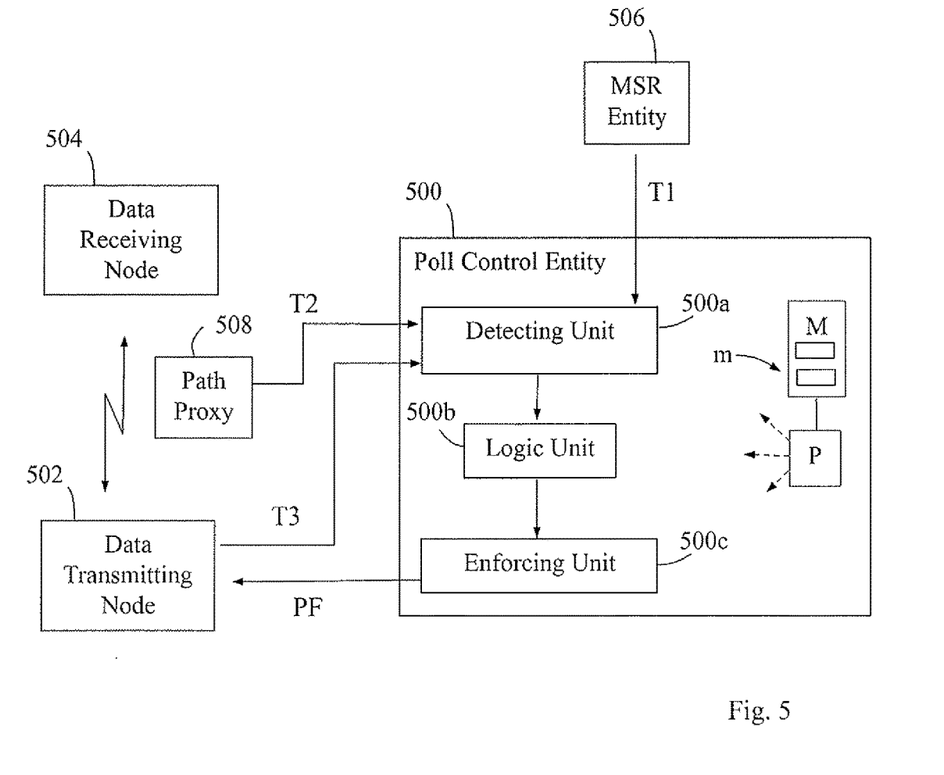
FIG. 5 is a block diagram illustrating a poll control entity in more detail when used, according to further possible embodiments.

A detailed but non-limiting example of how a poll control entity can be configured to accomplish the above-described embodiments is illustrated by the block diagram in FIG. 5. The poll control entity 500 is configured to control a polling procedure in a radio communication where a data transmitting node 502 transmits data to a data receiving node 504 and sends polls to the data receiving node according to a default polling frequency. As in the previous examples, the polls require the data receiving node to send feedback to the data transmitting node indicating whether the data has been received and decoded by the data receiving node or not.

The poll control entity 500 comprises a detecting unit 500a adapted to detect a trigger of the radio communication, here denoted T1, T2 or T3 referring to the above-described examples of the first, second and third triggers, which trigger indicates a deviation of a feedback time, which is the time period between the time of sending the poll and the time of receiving the feedback, from an expected feedback time range. Detecting the trigger of the radio communication may be done e.g. in the manner described for action 200 or any of actions 3:3a-c above. The poll control entity 500 also comprises a logic unit 500b adapted to adjust the polling frequency based on the detected trigger of the radio communication such that the deviation of feedback time is reduced. Adjusting the polling frequency may be done e.g. in the manner described for action 202 or action 3:4 above. The poll control entity 500 further comprises an enforcing unit 500c adapted to enforce the adjusted polling frequency PF at the data transmitting node 502. Enforcing the adjusted polling frequency may be done e.g. in the manner described for action 204 or action 3:5 above.

The above poll control entity 500 and its functional units 500a-c may be configured or adapted to operate according to various optional embodiments. For example, when the detected trigger of the radio communication indicates that the feedback time is longer than an upper limit of the expected feedback time range, the logic unit 500b may be adapted to adjust the polling frequency by decreasing the polling frequency. Thereby, the indicated deviation can be reduced such that the current feedback time decreases to eventually fall within the expected feedback time range again. On the other hand, when the detected trigger of the radio communication indicates that the feedback time is shorter than a lower limit of the expected feedback time range, the logic unit 500b may be adapted to adjust the polling frequency by increasing the polling frequency. Thereby, the indicated deviation can be reduced such that the feedback time increases to eventually fall within the expected feedback time range again. In another possible embodiment, the enforcing unit 500c may be further adapted to instruct the data transmitting node 502 to revert to the default polling frequency when it is detected that the feedback time is within the expected feedback time range.

In further possible embodiments, the detected trigger of the radio communication may comprise a first trigger T1 indicating that the utilization of a resource used for the radio communication exceeds an upper utilization limit or falls below a lower utilization limit. In that case, the detecting unit 500a may be further adapted to receive the first trigger T1 from an MSR entity 506.

The trigger of the radio communication may also comprise a second trigger T2 indicating that a current RTT of the radio communication between the data transmitting and receiving nodes 502, 504 exceeds an upper RTT limit or falls below a lower RTT limit. In that case, the logic unit 500b may be adapted to determine the feedback time by measuring at least a part of the current RTT. As mentioned above, the measured RTT part may be the time of conveying data from the data transmitting node to the data receiving node, or the time of conveying feedback from the data receiving node to the data transmitting node. This part of the current RTT may further depend on a delay in scheduling transmission of at least one of the data and the feedback. The detecting unit 500a may be further adapted to receive the second trigger T2 from a path proxy 508 located in a transmit-receive path between the data transmitting and receiving nodes 502, 504.

In further possible embodiments, the trigger of the radio communication may comprise a third trigger T3 and the detecting unit 500a may be further adapted to receive the third trigger from the data transmitting node 502 when the data transmitting node detects that the amount of pending data to be transmitted exceeds a data amount threshold.

It should be noted that FIG. 5 illustrates various functional units in the poll control entity 500 and the skilled person is able to implement these functional units in practice using suitable software and hardware. Thus, the solution is generally not limited to the shown structures of the poll control entity 500, and the functional units 500a-c may be configured to operate according to any of the features described in this disclosure, where appropriate.

The functional units 500a-c described above can be implemented in the poll control entity 500 by means of program modules of a respective computer program comprising code means which, when run by a processor "P" causes the poll control entity 500 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the poll control entity 500 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the poll control entity 500.

Some practical examples of executing the adjustment of the polling frequency will now be described. In a first set of examples, the poll control entity may be implemented in a scheduler of a base station such that the adjustment is executed in a scheduler which may be a scheduler of the Medium Access Control MAC layer in a base station that houses not only the base station MAC protocol peer but also the scheduler for downlink and uplink transmission. In this example, user plane control layers in the base station are configured to autonomously decrease the polling frequency, e.g. only down to a lower minimum, or increase the polling frequency, e.g. only up to an upper maximum. The scheduler may indirectly determine the polling frequency that is associated to an ongoing ARQ process by delaying the grant for transmission, e.g. only up to another upper maximum, or advancing the grant for transmission, e.g. only down to another lower minimum. Effectively, the number of transmission occasions can be controlled, or "throttled", in this way thus providing less or more opportunities, e.g. for the data transmitting node, to transmit.

When the adjustment of polling frequency is executed in a scheduler of a base station, it may be necessary that the scheduler is capable of differentiating between situations where the transmitter passes new data and where the sending new data from the transmitter has rather stalled and is stuck in retransmission, e.g. in a situation of not receiving feedback in time due to long feedback time. Preferably, the scheduler should not lay a hinder for the transmitter to advance its transmission window, which would otherwise put an unwanted restriction to the data throughput. A possible solution that could be used for downlink transmission of data is for the base station to use in-band bits including a "re-segmentation flag" (RF) bit, and a polling (P) bit, which bits can be sent together with data e.g. in a data packet such as an RLC PDU packet. In that case, the RLC layer transfers the RLC PDU packet which is received at the MAC layer as a MAC SDU. The MAC layer need not decode the RLC PDU packet in full but just extract the above bits from the data packet to determine if the packet includes new or retransmitted data.

The RF bit may be found in the second most significant bit of each MAC SDU (RLC PDU) and the P bit may be found in the next bit that follows in the data packet. This is typically the case, regardless of whether the RLC PDU contains an AM Data (AMD) PDU or a segment of an AMD PDU, also regardless of whether the RLC PDU contains two or more concatenated RLC SDUs or two or more segments of RLC SDUs. If RF=1, the RLC PDU is an AMD PDU segment. This format is used when the AM RLC entity needs to retransmit a portion of an AMD PDU. Therefore, the content of such an RLC PDU is deemed to not contain new data. If P=1 in this case, it can be assumed that the cause for polling is "Last Data Poll", i.e. a case where no new RLC data can be transmitted after the transmission of the RLC PDU, e.g. due to window stalling that is when advancement of the transmission window is restricted by long feedback time.

However, the condition RF=1; P=1 is deemed to be a necessary but not sufficient condition for detecting transmission window stalling. However, the transmission window may be stalled even if RF=0. For this scheme to be efficient, it is required that the MAC layer can distinguish any occurrences of polling due to window stalling. In that case, it is possible to let the RLC entity always use RF=1 when P=1 and the window is stalled, in the case when the cause for polling is expiry of the parameter t-PollRetransmit and no new data can be sent, e.g. regardless of whether a lower layer grant would fit some larger RLC PDU. Resources are typically strained at times of retransmissions, and would be much relaxed if the RLC transmitter uses a small AMD PDU segment instead of a larger size of the entire AMD PDU. The energy may instead be used for achieving greater robustness in the physical transmission. Alternatively, the RLC layer may implement some separate additional notification means instead of the above-suggested in-band bits RF, P to indicate that the polling is due to window stalling.

Both of these procedures of conveying information between the RLC and MAC layers can be used also for uplink transmission. However, it is necessary that the information arrives at appropriate time and place, and the scheduler may need to act proactively since the adjustment of polling frequency is made in the base station. The information that is needed at the scheduler to distinguish the case when transmitter window has stalled may be conveyed in the above-described manner of using the in-band RF and P bits, or internally within the MAC layer e.g. by using a specific MAC control element or the like. The information may also be provided by encoded feedback over the PUCCH channel or over the PUSCH channel. If a specific MAC control element is used for conveying the above information, this MAC control element may be any of the present existing MAC control elements used over an Uplink Shared Channel (UL-SCH), such as some of the BSR formats, e.g. an LCID of 11100, 11101 or 11110, but it can also be a new MAC control element, e.g. an LCID in the range of 01011-11000.

The RLC layer monitors ARQ re-transmissions and acts according to the t-PollRetransmit parameter, also ensuring that no RLC PDU is re-transmitted beyond a limit called maxRetxThreshold. It should be noted that this scheme can still work when the adjustment of polling frequency is executed in the scheduler. Also, the scheme may work without requiring that the scheduler has any in-depth understanding of ARQ retransmission. The scheduler may need to be enabled with one or more pre-defined limits in terms of allowed maximum and minimum polling frequency. It could be useful to have such polling frequency limits arranged with some regards to the parameters signaled to the data transmitting node, such as the parameters maxRetxThreshold; t-PollRetransmit; pollPDU; pollByte, which parameters can be used to control the re-transmission and polling in the RLC layer. For example, one such limit may be an upper maximum of a relaxed, or "conservative", polling frequency to be used during times of high traffic load and when there are some indication or risk of overloading some MSRs, or when a normal RTT cannot be achieved. The equation $f \leq f_{max} = 1/(n \times \text{"t-PollRetransmit"})$, where n is an integer, e.g. 4, may be used as an example of how to calculate such an upper maximum $f_{max}$ of polling frequency.

It may also be noted that this solution may be used to avoid polling frequencies that are more aggressive than what is the result of using a regular t-PollRetransmit, which may be configured by the RRC layer in the UE and by internal signaling in the serving base station. On the other hand, since the above scheme also may use a lower minimum of polling frequency as an overload protection, it may allow for more aggressive setting in the RLC layer.

Alternatively, an equation which determines the adapted polling frequency at high traffic load may be different, e.g. it may be exponentially "decaying" as determined by the equation $f \leq f_{max} = 1/(2^{n-1} \times \text{"t-PollRetransmit"})$, where n is a re-transmission count, i.e. an integer 1, 2, 3 . . . being the number of times where MAC consecutively detects poll due to window stalling, e.g. a re-transmission count that scales with the parameter "RETX_COUNT" normally used by the RLC layer but which instead can be realized in the MAC layer.

In a second set of examples, the poll control entity may be implemented in a data transmitting node such that the adjustment of polling frequency is instead executed in the data transmitting node, e.g. an RLC Transmitter. In that case, the data transmitting node is in direct control of the polling schemes used for providing feedback from the data receiving node to the data transmitting node. Just as in the first set of examples above, user plane control layers in the base station can be configured to autonomously decrease the polling frequency, e.g. down to a lower minimum, or increase the polling frequency, e.g. up to an upper maximum.

Also here, it may be possible to transmit data in a small AMD PDU segment (use RF=1) instead of a complete AMD PDU which is larger, whenever P=1 and the transmission window is stalled.

As in the case when the polling frequency is adjusted in a scheduler, the data transmitting node may be configured with a minimum and a maximum of polling frequency as limitations to the adjustment. But since pacer is explicitly exposed to ARQ, the above minimum and maximum of polling frequency may be directly inferred from the parameter t-PollRetransmit.

For example, the value conveyed by the t-PollRetransmit parameter may determine an upper maximum for polling frequency that occurs at times when neither reporting MSRs nor measured RTTs indicate a need to reduce the polling frequency. The corresponding polling frequency is typically selected to maximize throughput during regular traffic hours at times when the radio channel is not obstructing for RTT and when there is no risk of overloading any resources.

Another upper maximum may correspond to an adapted relaxed polling frequency during times of high traffic load when there is a risk of overloading some MSRs or when a normal RTT cannot be achieved. The equation $f \leq f_{max} = 1/(n \times \text{"t-PollRetransmit"})$, where n is an integer, e.g. 4, may be used as an example of how to calculate such an upper maximum $f_{max}$ of polling frequency.

Alternatively, an equation which determines the adapted polling frequency at high traffic load may be different, e.g. it may be exponentially "decaying" as determined by the equation $f \leq f_{max} = 1/(2^{n-1} \times \text{"t-PollRetransmit"})$, where n is a re-transmission count, i.e. an integer 1, 2, 3 ... used by the RLC layer.

A possible advantage with implementing the poll control entity in the data transmitting node is that the polling frequency can be adjusted individually on a per bearer basis, thus allowing for different strategies tailored to match different QoS levels required by different bearers.

By using any of the above examples of adjusting the polling frequency to adapt it to the feedback time, the data transmitting node can adjust the polling frequency to prolong or shorten the interval between consecutive re-transmissions of data, e.g. by adapting the parameter f-PollRetransmit to estimated or measured changes in the current feedback time. Prolonged polling intervals can be useful in some cases since it can reduce the amount of unnecessary re-transmissions of data and polling for status reporting at high traffic load and/or bad radio conditions when only a relatively long feedback time can be achieved. It also protects against too many unnecessary data re-transmissions and/or against conditions that might overload some bottleneck resource. On the other hand, shorter polling intervals can be used to receive more frequent feedback to reduce the number of already sent packets that need to be buffered while waiting for the feedback. This can be used to increase the data throughput in the radio communication, particularly if buffering capacity is a limiting factor.

For example, in a situation with high traffic load in the network, the processing capability typically decreases as the traffic load approaches the network's capacity limits. In this case, it is an advantage that the load on network elements and entities can be relieved by avoiding some unnecessary re-transmissions of data by means of the embodiments described herein.

While the solution has been described with reference to specific possible embodiments and examples, e.g. the RLC and AM procedures used in LTE, the description is generally only intended to illustrate how the solution may be implemented and should not be taken as limiting the scope of the solution which may be used also in other networks than LTE networks, where appropriate. For example, the terms "poll control entity", "data transmitting node", "data receiving node", "poll", "trigger", "MSR entity" and "path proxy" have been used throughout this description, although any other corresponding entities, functions, and/or parameters could also be used having the features and characteristics described here. The solution is defined by the appended claims.

The invention claimed is:

1. A method performed by a poll control entity for controlling a polling procedure where a data transmitting node transmits data to a data receiving node and sends polls to the data receiving node at a polling frequency set according to a default polling frequency, said polls requiring the data receiving node to send feedback to the data transmitting node indicating whether said data has been received and decoded by the data receiving node or not, the method comprising:
detecting a trigger indicating a deviation of a feedback time from an expected feedback time range within which the feedback time is expected to fall, wherein the feedback time comprises a time period between a time of sending the poll and a time of receiving the feedback whether the data has been received by the data receiving node or not, wherein the data is transmitted with or prior to a transmission of the poll,
adjusting the polling frequency from the default polling frequency to an adjusted polling frequency based on said trigger such that the deviation of the feedback time is reduced, and
enforcing the adjusted polling frequency at the data transmitting node.

2. The method according to claim 1, wherein the detected trigger indicates that the feedback time is longer than an upper limit of the expected feedback time range, and adjusting the polling frequency comprises decreasing the polling frequency to the adjusted polling frequency.

3. The method according to claim 1, wherein the detected trigger indicates that the feedback time is shorter than a lower limit of the expected feedback time range, and adjusting the polling frequency comprises increasing the polling frequency to the adjusted polling frequency.

4. The method according to claim 1, wherein further comprising:
instructing the data transmitting node to revert to the default polling frequency in response to detecting that the feedback time has returned within the expected feedback time range.

5. The method according to claim 1, wherein the trigger comprises a first trigger indicating that a utilization of a resource exceeds an upper utilization limit or falls below a lower utilization limit.

6. The method according to claim 5, wherein the first trigger is received from a Monitored System Resources (MSR) entity.

7. The method according to claim 1, wherein the trigger comprises a second trigger indicating that a current Round Trip Time (RTT) between the data transmitting node and the data receiving node exceeds an upper RTT limit or falls below a lower RTT limit.

8. The method according to claim 7, wherein the feedback time is determined by measuring a part of the current RTT.

9. The method according to claim 8, wherein said part of the current RTT depends on a delay of scheduling transmission of at least one of the data and the feedback.

10. The method according to claim 7, wherein the second trigger is received from a path proxy located in a transmit-receive path between the data transmitting node and the data receiving node.

11. The method according to claim 1, wherein the trigger comprises a third trigger received from the data transmitting node when the data transmitting node detects that an amount of pending data to be transmitted by the data transmitting node exceeds a data amount threshold.

12. The method according to claim 1, wherein the poll control entity is implemented in a scheduler of a base station or in said data transmitting node.

13. A poll control entity configured to control a polling procedure where a data transmitting node transmits data to a data receiving node and sends polls to the data receiving node at a polling frequency set according to a default polling frequency, said polls requiring the data receiving node to send feedback to the data transmitting node indicating whether said data has been received and decoded by the data receiving node or not, the poll control entity comprising:
a memory storing instructions; and
a processor operable to execute the instructions to cause the poll control entity to:
detect a trigger indicating a deviation of a feedback time from an expected feedback time range within which the feedback time is expected to fall, wherein the feedback time comprises a time period between a time of sending the poll and a time of receiving the feedback whether the data has been received by the data receiving node or not, wherein the data is transmitted with or prior to a transmission of the poll,
adjust the polling frequency from the default polling frequency to an adjusted polling frequency based on said trigger such that the deviation of the feedback time is reduced, and
enforce the adjusted polling frequency at the data transmitting node.

14. The poll control entity according to claim 13, wherein when the detected trigger indicates that the feedback time is longer than an upper limit of the expected feedback time range, the processor is further operable to execute the instructions to cause the poll control entity to decrease the polling frequency to the adjusted polling frequency.

15. The poll control entity according to claim 13, wherein when the detected trigger indicates that the feedback time is shorter than a lower limit of the expected feedback time range, the processor is further operable to execute the instructions to cause the poll control entity to increase the polling frequency to the adjusted polling frequency.

16. The poll control entity according to claim 13, wherein the processor is further operable to execute the instructions to cause the poll control entity to:
instruct the data transmitting node to revert to the default polling frequency in response to detecting that the feedback time has returned within the expected feedback time range.

17. The poll control entity according to claim 13, wherein the trigger comprises a first trigger indicating that a utilization of a resource exceeds an upper utilization limit or falls below a lower utilization limit.

18. The poll control entity according to claim 17, wherein the processor is further operable to execute the instructions to cause the poll control entity to:
receive the first trigger from a Monitored System Resources (MSR) entity.

19. The poll control entity according to claim 13, wherein the trigger comprises a second trigger indicating that a current Round Trip Time (RTT) between the data transmitting node and the data receiving node exceeds an upper RTT limit or falls below a lower RTT limit.

20. The poll control entity according to claim 19, wherein the processor is further operable to execute the instructions to cause the poll control entity to:
determine the feedback time by measuring a part of the current RTT.

21. The poll control entity according to claim 20, wherein said part of the current RTT depends on a delay of scheduling transmission of at least one of the data and the feedback.

22. The poll control entity according to claim 19, wherein the processor is further operable to execute the instructions to cause the poll control entity to:
receive the second trigger from a path proxy located in a transmit-receive path between the data transmitting node and the data receiving node.

23. The poll control entity according to claim 13, wherein the trigger comprises a third trigger and the processor is further operable to execute the instructions to cause the poll control entity to:
receive the third trigger from the data transmitting node when the data transmitting node detects that an amount of pending data to be transmitted by the data transmitting node exceeds a data amount threshold.

24. The poll control entity according to claim 13, wherein the poll control entity is implemented in a scheduler of a base station or in said data transmitting node.

\* \* \* \* \*

UNITED STATES PATENT AND TRADEMARK OFFICE
CERTIFICATE OF CORRECTION

| | | |
|---|---|---|
| PATENT NO. | : 9,894,548 B2 | Page 1 of 1 |
| APPLICATION NO. | : 14/648333 | |
| DATED | : February 13, 2018 | |
| INVENTOR(S) | : Bergquist et al. | |

It is certified that error appears in the above-identified patent and that said Letters Patent is hereby corrected as shown below:

In the Specification

In Column 3, Line 15, delete "node. the" and insert -- node. The --, therefor.

In Column 15, Lines 35-36, delete "f-PollRetransmit" and insert -- t-PollRetransmit --, therefor.

Signed and Sealed this
Fourteenth Day of May, 2019

Andrei Iancu
*Director of the United States Patent and Trademark Office*